(12) United States Patent
Jia et al.

(10) Patent No.: US 9,610,823 B2
(45) Date of Patent: Apr. 4, 2017

(54) VEHICLE HVAC TEMPERATURE CONTROL SYSTEM

(75) Inventors: Mingyang Jia, Troy, MI (US); Yang Chen, Windsor (CA); Frederic Guilbaud, Stuttgart (DE); Robert Levander, Linden, MI (US); Cristian Velehorschi, Windsor (CA); Gunnar Schlinke, Troy, MI (US)

(73) Assignee: MAHLE International GmbH, Stuttgart (DE)

( * ) Notice: Subject to any disclaimer, the term of this patent is extended or adjusted under 35 U.S.C. 154(b) by 1500 days.

(21) Appl. No.: 12/565,999

(22) Filed: Sep. 24, 2009
(Under 37 CFR 1.47)

(65) Prior Publication Data
US 2011/0105007 A1    May 5, 2011

Related U.S. Application Data

(60) Provisional application No. 61/099,980, filed on Sep. 25, 2008.

(51) Int. Cl.
*B60H 1/00* (2006.01)
(52) U.S. Cl.
CPC ............ *B60H 1/00064* (2013.01); *B60H 2001/00092* (2013.01); *B60H 2001/00192* (2013.01); *Y10T 29/49* (2015.01)
(58) Field of Classification Search
CPC .................................................. B60H 1/00685
USPC ................... 454/121, 127, 156, 159; 165/42
See application file for complete search history.

(56) References Cited

U.S. PATENT DOCUMENTS

| | | | | |
|---|---|---|---|---|
| 5,902,181 A | * | 5/1999 | Bain | B60H 1/247 454/144 |
| 6,231,437 B1 | * | 5/2001 | Loup et al. | 454/160 |
| 6,351,961 B1 | * | 3/2002 | Kurokawa et al. | 62/244 |
| 6,595,276 B2 | * | 7/2003 | Bendell | B60H 1/00064 165/202 |
| 6,652,372 B2 | * | 11/2003 | Muller | B60H 1/00671 454/156 |
| 6,695,691 B1 | * | 2/2004 | Le | B60H 1/00678 454/121 |
| 6,852,024 B2 | * | 2/2005 | Seki | B60H 1/00685 165/43 |
| 6,913,529 B2 | * | 7/2005 | Seki | B60H 1/00042 165/43 |
| 7,063,612 B2 | * | 6/2006 | Kaszycki | B60H 1/0005 454/121 |

(Continued)

FOREIGN PATENT DOCUMENTS

| | | | |
|---|---|---|---|
| DE | 19501593 A1 | * | 7/1995 |
| FR | 2778151 A1 | * | 11/1999 |
| FR | 2786134 A1 | * | 5/2000 |

*Primary Examiner* — Gregory Huson
*Assistant Examiner* — Martha Becton
(74) *Attorney, Agent, or Firm* — Muncy, Geissler, Olds & Lowe, P.C.

(57) ABSTRACT

A vehicle having an HVAC system with a particular ventilation housing design and method for making the same are described. The ventilation housing has a common mode door for defrost and floor panels and allows efficient use of components to provide effective operation in bi-level and other modes. In bi-level mode, the mode doors can be operated to form flow path such that floor outlet is virtually on the upstream side of the panel outlet.

23 Claims, 10 Drawing Sheets

(56) References Cited

U.S. PATENT DOCUMENTS

| | | | |
|---|---|---|---|
| 8,382,563 B2* | 2/2013 | Sievers | B60H 1/00007 454/126 |
| 2003/0037918 A1* | 2/2003 | Lee | B60H 1/00064 165/202 |
| 2005/0118944 A1* | 6/2005 | Vincent | B60H 1/00064 454/121 |
| 2006/0151162 A1* | 7/2006 | Kiel | B60H 1/00685 165/204 |
| 2006/0154592 A1* | 7/2006 | Wawzyniak | B60H 1/00685 454/121 |
| 2007/0042699 A1* | 2/2007 | Kiel et al. | 454/143 |
| 2007/0128999 A1* | 6/2007 | Komowski | B60H 1/00685 454/155 |
| 2007/0181295 A1* | 8/2007 | Masatsugu | B60H 1/00842 165/202 |
| 2007/0256446 A1* | 11/2007 | Hackl | B60H 1/00685 62/410 |
| 2007/0266721 A1* | 11/2007 | Seki et al. | 62/244 |
| 2009/0209189 A1* | 8/2009 | Kiel | B60H 1/00685 454/145 |
| 2009/0305623 A1* | 12/2009 | Lange | B60H 1/00671 454/121 |
| 2010/0155015 A1* | 6/2010 | Hoehn | B60H 1/0005 165/42 |
| 2011/0073273 A1* | 3/2011 | Seto | B60H 1/00064 165/42 |

* cited by examiner

VEHICLE HVAC TEMPERATURE CONTROL SYSTEM

CROSS REFERENCE TO RELATED APPLICATIONS

The present application claims benefit of priority to U.S. Provisional Application Ser. No. 61/099,980, filed Sep. 25, 2008, the entire contents of which is incorporated herein by reference.

BACKGROUND OF THE INVENTION

The current application relates to a low cost temperature control system. In particular, the present application relates to low-cost heating, ventilating and air conditioning (HVAC) system for a vehicle. In certain embodiments, the present application relates to a ventilation housing for a vehicle heating/cooling system.

The automobile industry places a particular emphasis on economy, and there is a desire to reduce the cost and improve the efficiency of vehicle components. The inventors have perceived that in a vehicle HVAC system, it is important to provide air with controlled temperature to each outlet. The desired temperature at each outlet differs in different modes of operation, such as vent, floor, bi-level and defrost, which makes HVAC housing design difficult. Usually, multiple doors or flaps together with mixing devices such as guide vanes, baffles or deflectors, are utilized to accomplish the task. However, each such structure adds cost to the system. Adding mixing devices also usually causes a pressure drop and increases the noise level of the system. In particular, it has been difficult to provide for a low-cost vehicle HVAC system that meets the packaging space requirements, provides low flow resistance in floor/defrost full hot mode and panel full cold mode, and achieves required temperature stratification in bi-level and defog modes.

The inventors of the present application have perceived particular ways to reduce the costs and increase the economy of a vehicle HVAC system. The application describes in particular an HVAC system having an efficient and economical use of components and space in the ventilation housing, while improving upon the performance characteristics of the system.

SUMMARY OF THE INVENTION

The problems discussed above are solved by the embodiments of the invention. The embodiments provide new concepts of HVAC (or ventilation) housing, door configuration and the door operation strategy. At floor/defrost full hot mode or panel full cold mode, where achieving a high air flow rate and low noise level has been a challenge, the embodiments form smooth air flow paths and impose minimal disturbance to the air flow. In bi-level and mixed (defog) modes, where mixing and temperature stratification has been a difficult issue, the embodiments provide for doors that are rotated to positions which guide warm and cold air in desired directions and improve mixing to achieve a desired temperature stratification.

Specifically, one aspect of the invention relates to a vehicle having a ventilation system, comprising a heater, an air conditioner, a ventilation housing configured to conduct air from the heater or air from the air conditioner or both; a floor outlet of the ventilation housing; a defrost outlet of the ventilation housing; a panel outlet of the ventilation housing; and a first mode door configured to regulate a flow of air at the defrost outlet and at the floor outlet. Optionally, the defrost outlet is located in the vicinity of the floor outlet. More particularly, the first mode door can comprise a first wall rotationally mounted on a hinge member, a second wall rotationally mounted on a hinge member, and an arc member connecting the two walls, wherein the first wall and the arc member are resistant to the flow of air. The ventilation housing can further comprise a second mode door configured to regulate the flow of air at the panel outlet. This second mode door can comprise a first wall rotationally mounted on a hinge member, a second wall rotationally mounted on a hinge member, and an arc member connecting the two walls, wherein the arc member is resistant to the flow of air and the first wall and second wall are resistant to the flow of air for parts of their respective lengths.

Optionally, the first mode door and the second mode door are each configured to pivot within a portion of the housing that is at least in part semicircular, such that the gap between a wall member and the semicircular housing is minimal during at least a portion of traversable angle of the respective first or second mode door. Preferably, the ventilation housing is configured to be operable in a bi-level mode, wherein the first mode door and second mode door are configured to regulate the flow of air in the bi-level mode such that the air flow path is longer to the panel outlet than to the floor outlet. The vehicle ventilation housing may optionally comprise a third mode door configured to select a mixture of air from the air conditioner and air from the heater.

Embodiments of the invention also relate to an HVAC system capable of operating in a bi-level mode, comprising a heater, an air conditioner, a ventilation housing configured to conduct air from a heater or air from the air conditioner or both, a floor outlet of the ventilation housing, a defrost outlet of the ventilation housing, a panel outlet of the ventilation housing, and a first mode door configured to regulate a flow of air at the defrost outlet and at the floor outlet. Optionally, the defrost outlet is located in the vicinity of the floor outlet. Preferably, the first mode door comprises a first wall rotationally mounted on a hinge member, a second wall rotationally mounted on a hinge member, and an arc member connecting the two walls, wherein the first wall and the arc member are resistant to the flow of air. Moreover, the system may also comprise a second mode door configured to regulate the flow of air at the panel outlet, wherein the second mode door comprises a first wall rotationally mounted on a hinge member, a second wall rotationally mounted on a hinge member, and an arc member connecting the two walls, and wherein the arc member is resistant to the flow of air and the first wall and second wall are resistant to the flow of air for parts of their respective lengths.

Preferably, the first mode door and the second mode door are each configured to pivot within a portion of the housing that is at least in part semicircular, such that the gap between a wall member and the semicircular housing is minimal during at least a portion of traversable angle of the respective first or second mode door. Optionally, the ventilation housing is configured to be operable in a bi-level mode, and the first mode door and second mode door are configured to regulate the flow of air in the bi-level mode such that the air flow path is longer to the panel outlet than to the floor outlet. The system may further comprise a third mode door configured to select a mixture of air from the air conditioner and air from the heater.

Embodiments of the invention also relate to a method of manufacturing a vehicle ventilation system, comprising providing a ventilation housing, providing a first mode door configured to regulate a flow of air at the defrost outlet and at the floor outlet, providing a second mode door configured to regulate the flow of air at the panel outlet, wherein the ventilation housing is configured to be operable in a bi-level mode, and wherein the first mode door and second mode door are configured to regulate the flow of air in the bi-level mode such that the air flow path is longer to the panel outlet. The method may also be practiced such that the first mode door comprises a first wall rotationally mounted on a hinge member, a second wall rotationally mounted on a hinge member, and an arc member connecting the two walls, and wherein the first wall and the arc member are resistant to the flow of air.

Optionally, the second mode door comprises a first wall rotationally mounted on a hinge member, a second wall rotationally mounted on a hinge member, and an arc member connecting the two walls, wherein the arc member is resistant to the flow of air and the first wall and second wall are resistant to the flow of air for parts of their respective lengths. Preferably, herein the first mode door and the second mode door are each configured to pivot within a portion of the housing that is at least in part semicircular, such that the gap between a wall member and the semicircular housing is minimal during at least a portion of traversable angle of the respective first or second mode door.

DESCRIPTION OF EMBODIMENTS

Figure 1:
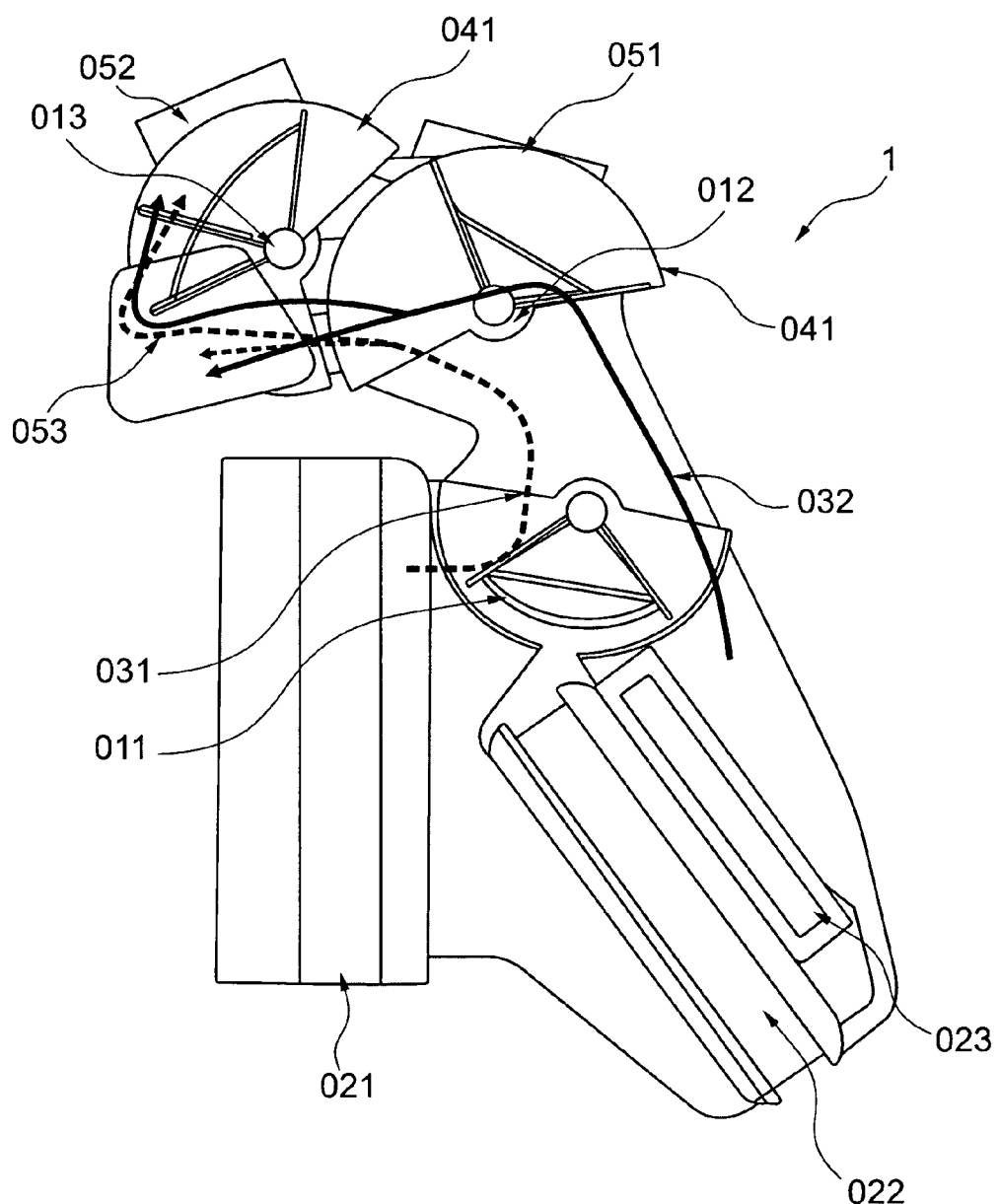
FIG. 1 is a cross-sectional view of a vehicle ventilation housing showing an air flow pattern in a mixed mode.

Various embodiments of the invention will be described hereinafter with reference to the figures. In the figures, like reference numerals denote like elements.

FIG. 1 shows a side view of a ventilation housing 1. The term ventilation housing is used herein generally to describe one or more parts of a structure designed to guide or regulate airflow. The housing 1 has a first mode door 13, a second mode door 12 and a third "temperature" temperature door 11. The term "mode door" is used herein to describe a structure whose purpose is to change the flow path or mixture of air. The ventilation housing 1 is further connected to the output of an air conditioner 21, which can be any device that provides or lets through cool air, and heaters 22 or, optionally heater 22 and 23, which are devices that provide warm air, usually through heat exchange with a system producing heat. The ventilation housing further comprises curved housing walls 41, a panel outlet 51, a defrost outlet 52, and a floor outlet 53, which may also be fitted with baffles, guides, or similar structures. The various outlets are openings that direct the air to specific directions. A defrost outlet directs its opening toward a potentially frosted structure such as a windshield. A floor outlet directs airflow in the vicinity of the compartment floor. A panel outlet directs airflow in the vicinity of the compartment above the floor.

FIG. 1 also shows the flow path of a cold air stream 31 (dotted arrow) and a warm air stream 32 (solid arrow). The term "flow path" means the average path air takes getting from one place to another. In FIG. 1, the mode doors are shown operating in a "mixed" or "defog" mode. The mode door 13 serves both floor outlet 53 and defrost outlet 52.

Mode door 13 regulates the flow at the defrost outlet 52 and the floor outlet 53. In the present application, regulating the flow "at" an outlet means that a structure is changeable to increase or decrease the amount of air flowing through an outlet, and is the last such element preceding the outlet in the airflow. In a conventional design, floor outlet 53 would be located in a position further upstream, such as between temperature door 11 and mode door 12, in order to guide more warm air to the floor and create a favorable temperature stratification, e.g., where the floor temperature is higher than the panel temperature in a bi-level mode. However, locating the floor outlet 53 outside of the vicinity of the defrost outlet 52 would require separate mode doors for floor and defroster, which increases the cost of the system. In the present application, the two outlets are "in the vicinity" of one another if it is possible to regulate the flow to both outlets using one mode door. In the current embodiment, the floor outlet 53 and defroster outlet 52 are located adjacent to each other. Therefore, only one mode door 013 is needed to serve both floor and defroster.

Figure 2:
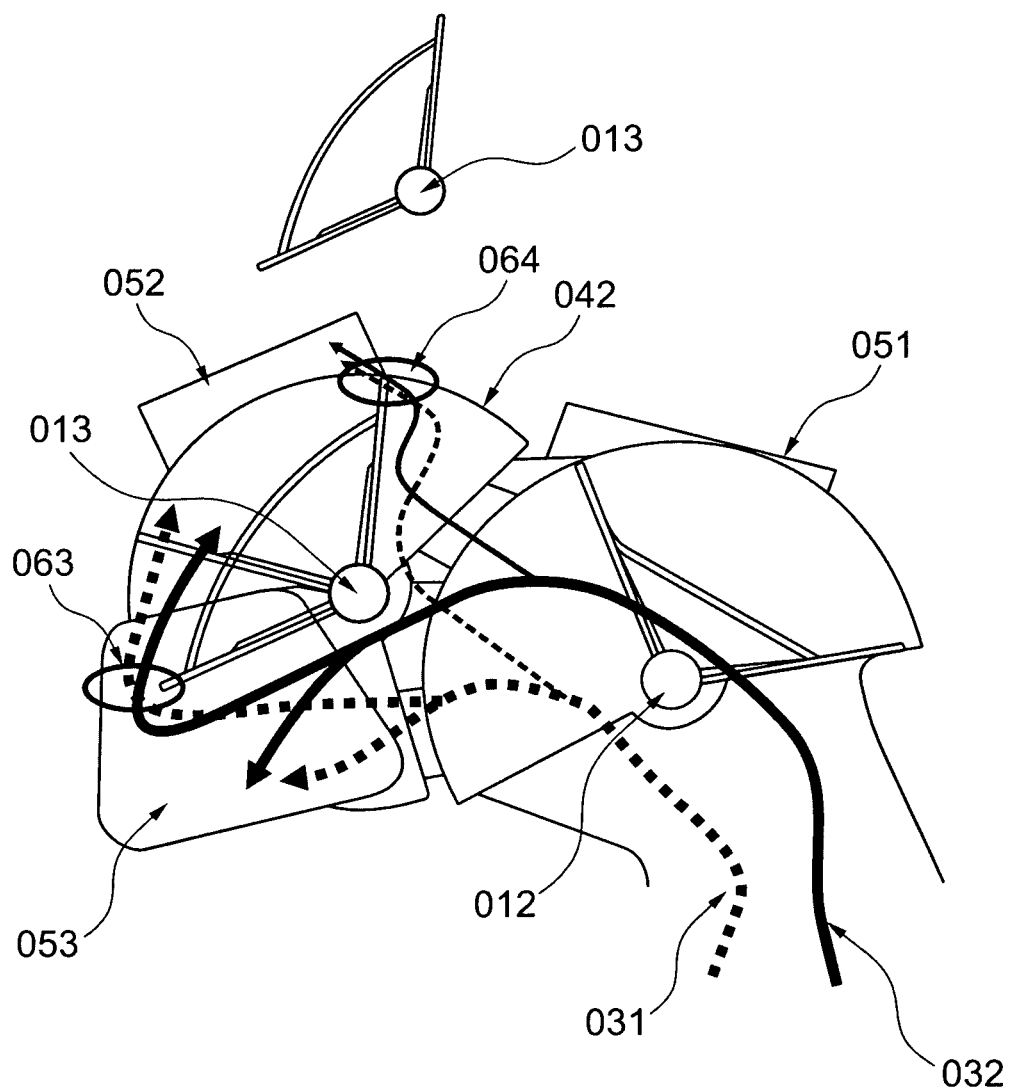
FIG. 2 is a cross-sectional view of a vehicle ventilation housing showing mode door positions in a mixed mode.

FIG. 2 illustrates more closely the first mode door 13 for floor and defrost outlets 52 and 53 respectively, together with an air flow pattern. The first mode door 13 comprises two wall members having an arc member therebetween. The term "arc member" should be understood to be a structural element connecting the two wall members to form a three-sided shape. The term arc, however, describes the connectivity, and not necessarily an arcuate shape. First mode door 13 rotates on a hinge member, which can be any structure that allows rotation of the two wall members.

FIG. 2 additionally shows an air flow opening 63 leading to the defrost outlet and an clearance 64 between a wall member of the first mode door 13 and the semicircular wall of the ventilation housing 42. The profile of the housing around the first mode door 42 is designed so that when mode door 13 swings open, up to a specified traversal angle, there is a minimal opening 64 on the upper side, while opening 63 increases. Since opening 63 is very close to floor outlet 53, the stratification between floor and defroster can be controlled to within a small value, which is desired when operating in a mixed mode.

In a bi-level mode, floor temperature should be higher than panel temperature. In conventional designs, this is achieved by locating the floor outlet 53 upstream of the panel outlet 51, such as a position between mode door 12 and temperature door 11 of FIG. 1. In the present embodiment, in contrast, the floor outlet 53 is preferably in the vicinity of, or even directly adjacent to defroster outlet 52.

The relative location of windshield and panel vent grills usually defines the relative locations of defroster outlet 52 and panel outlet 51, where outlet 52 is located downstream of outlet 51. Therefore, to use a common door for both defroster and floor, floor outlet 53 is preferably located downstream of panel outlet 51.

Figure 3:
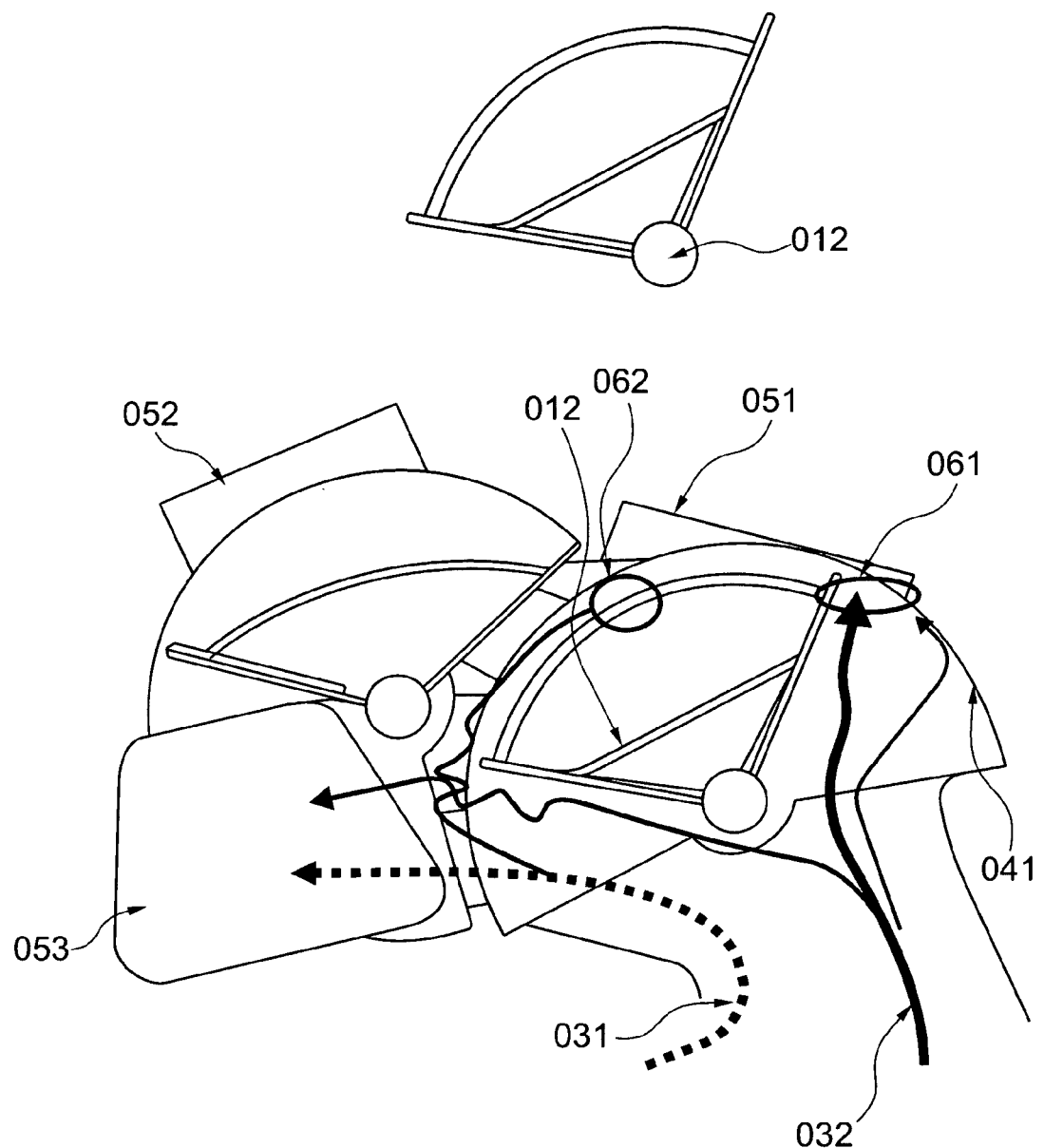
FIG. 3 is a cross-sectional view of a vehicle ventilation housing illustrating a potential design disadvantage of a conventional design.

The disadvantage of a conventional design is illustrated by FIG. 3 in bi-level mode, where opening 61 leads to the panel outlet 51. The warm air directly impinges opening 61 and enters panel outlet 51. Meanwhile, the cold air 31 mainly enters floor outlet 53. This result in a reversed (undesirable) stratification, i.e., the floor temperature is lower than the panel temperature.

Figure 4:
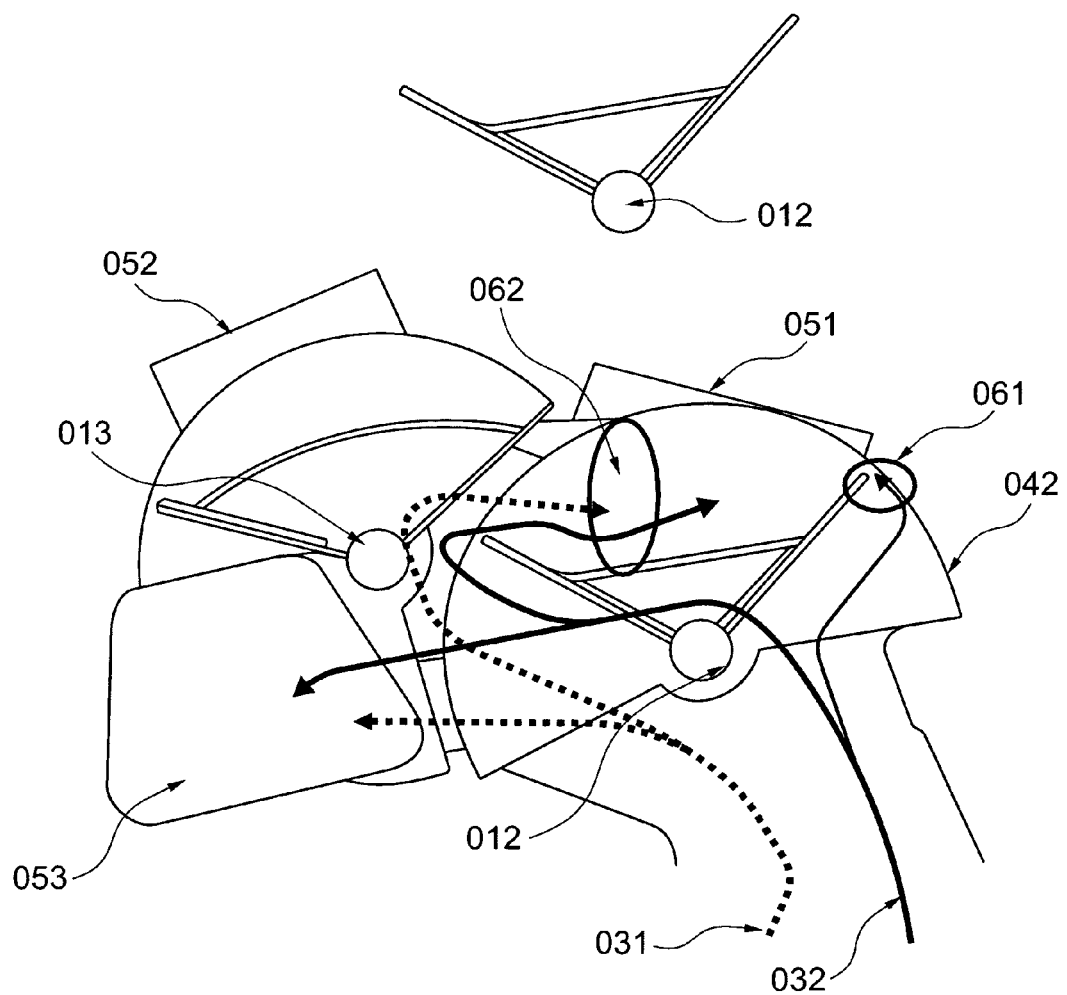
FIG. 4 is a cross-sectional view of a vehicle ventilation housing showing mode door positions in a bi-level mode.

FIG. 4 shows a mode door concept and the ventilation or HVAC housing provided by an embodiment. A housing wall 42 is provided in semicircular form along at least a portion of the traversal angle of second mode door 12, such that when mode door 12 swings open, there is only a minimum clearance 61 between mode door 12 and the housing wall 42, up to a specific traversal angle. On the downstream side of mode door 12, the opening 62 increases as door 12 opens. This forces both the cold and warm air to turn toward the floor outlet 53 first, and then to turn to the panel outlet 51 through opening 62. This door configuration and the operation method effectively creates a curved flow path, such that the floor outlet 53 is virtually switched to the upstream side of panel outlet 51. In other words, the flow path from the heater and/or air conditioner to panel outlet 51 is longer than to floor outlet 53. The curved flow path also improves the thermal mixing and reduces the horizontal temperature imbalance, that is, the temperature difference between panel outboard and panel center). Therefore, a favorable temperature stratification, with floor temperature higher than panel, is achieved.

Figure 5:
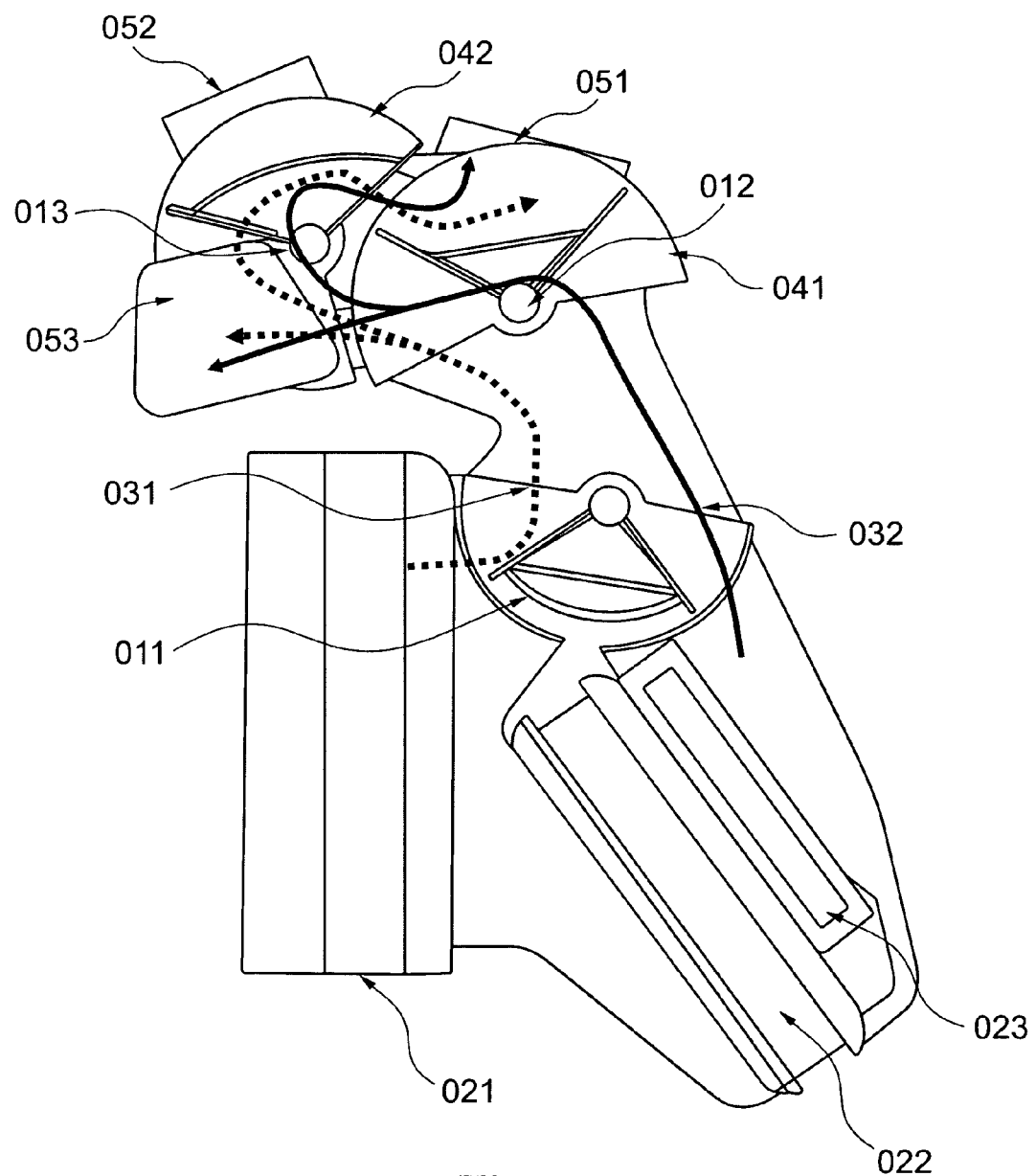
FIG. 5 is a cross-sectional view of a vehicle ventilation housing showing air flow patters in a bi-level mode.

FIG. 5 shows a side view of the ventilation housing, with door positions and an air flow pattern according to operation in a bi-level mode. In bi-level mode, this embodiment uses mode door 12 as a flow regulating device to guide the cold/warm air flows 31 and 32 and to increase the thermal mixing. This is advantageous over conventional designs, which depend on stratification baffles or guide vanes in the air flow path to improve thermal mixing.

Figure 6:
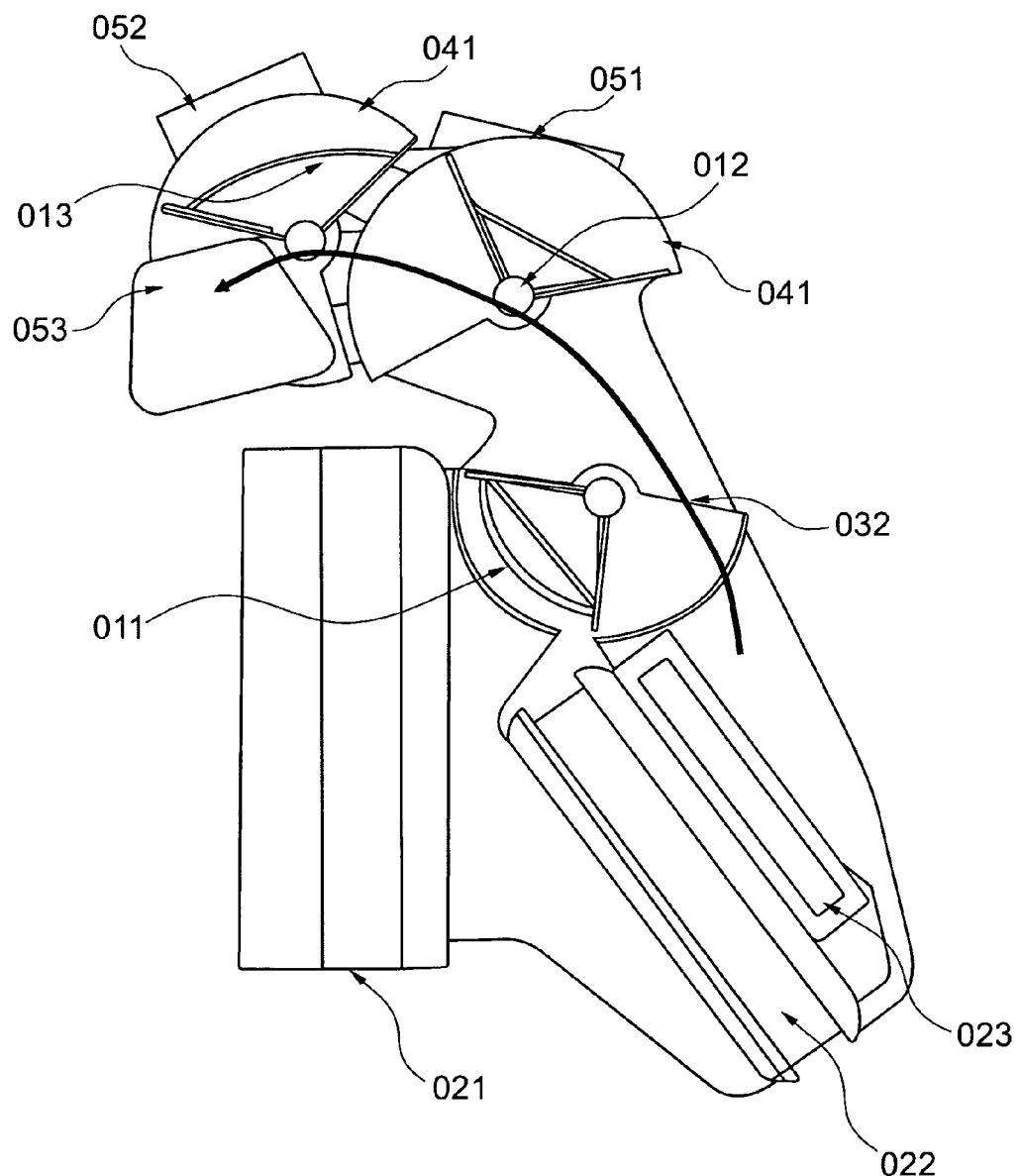
FIG. 6 is a cross-sectional view of a vehicle ventilation housing showing air flow patters in a floor full hot mode.

FIG. 6 shows a side view of a ventilation housing having an air flow pattern corresponding to operation in a floor full hot mode. At floor full hot mode, mode door 13 closes the defrost outlet 52 and mode door 12 closes panel outlet 51. There is no obstruction in the air flow path from the heater 23 to the floor outlet 53. Therefore there is less resistance to air flow. This is true even where a slight diversion of warm air to a panel or defrost outlet is required, which the mode doors 12 and 13 can facilitate.

Figure 7:
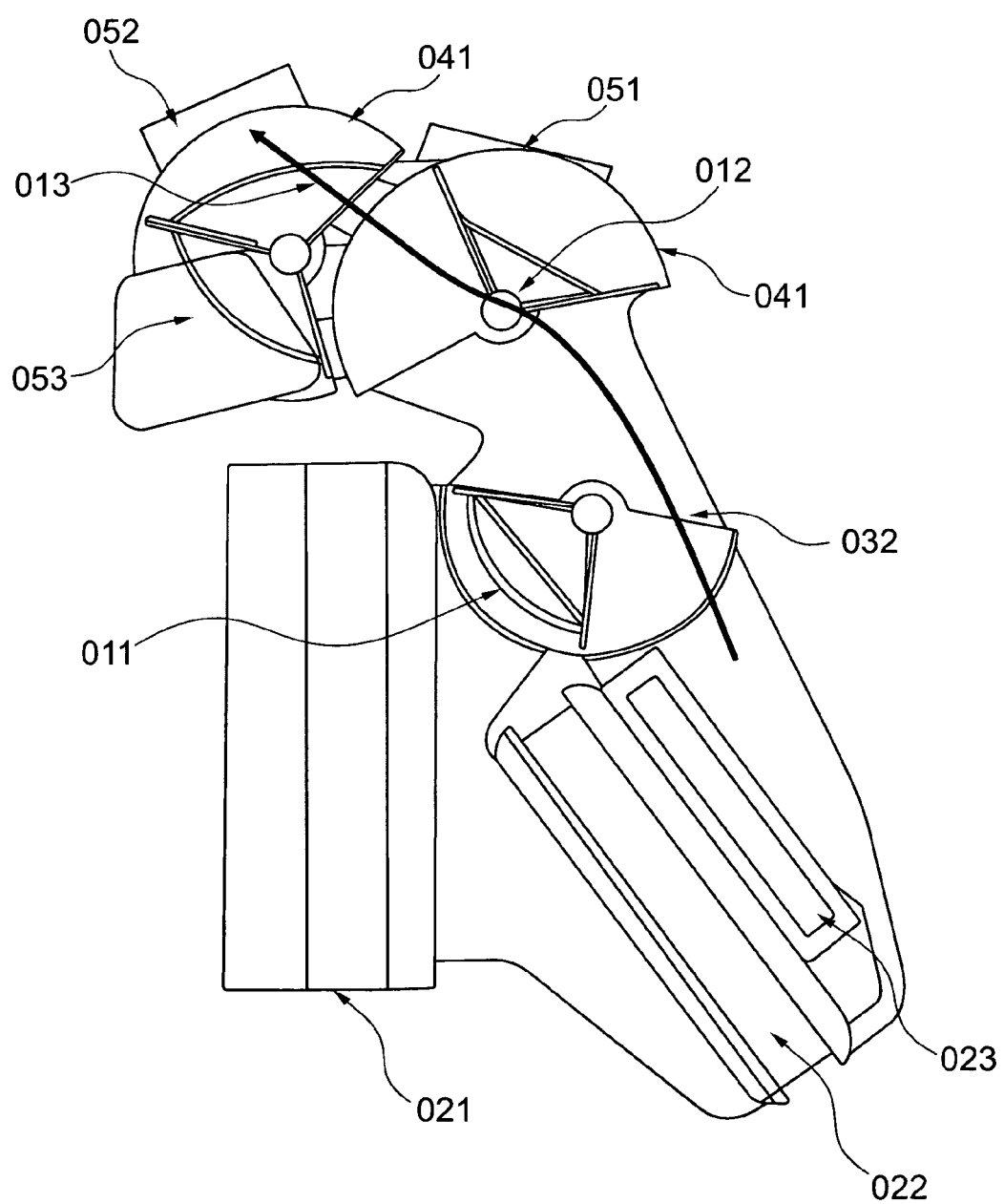
FIG. 7 is a cross-sectional view of a vehicle ventilation housing showing air flow patterns in a defrost full hot mode.

FIG. 7 a side view of a ventilation housing having an air flow pattern corresponding to operation in a defrost full hot mode. In defrost full hot mode, mode door 13 closes the floor outlet 53 and mode door 12 closes panel outlet 51. There is no obstruction in the air flow path from the heater 23 to the defrost outlet 53. Therefore there is less resistance to air flow. This is true even where a slight diversion of warm air to a panel or floor outlet is required, which the mode doors 12 and 13 can facilitate.

Figure 8:
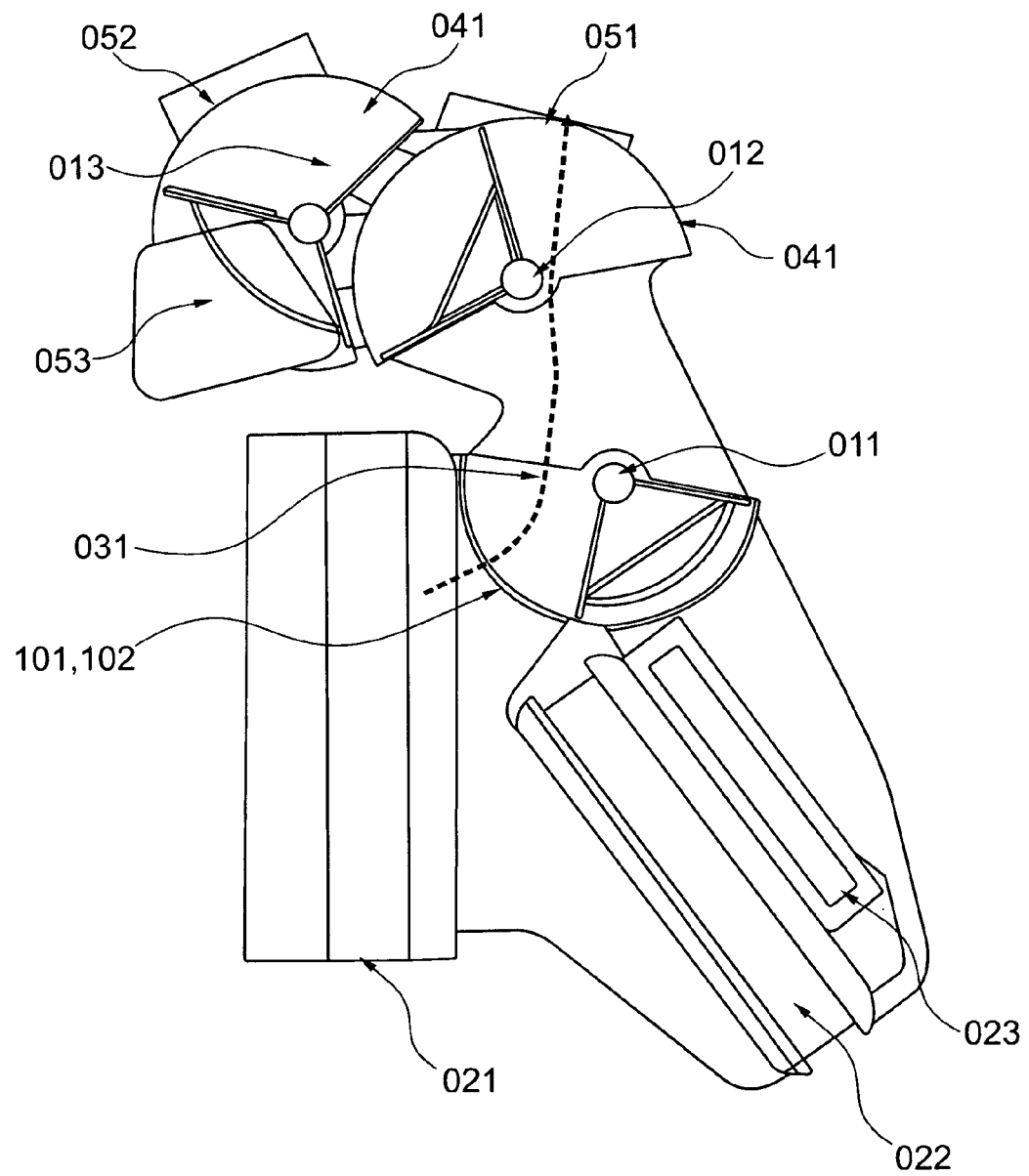
FIG. 8 is a cross-sectional view of a vehicle ventilation housing showing air flow patterns in a panel full cold mode.

Optionally, baffles can be added upstream of temperature door 11. FIG. 8 additionally shows a temperature door with baffles 101 and 102, through which air passes. Although baffles 101 and 102 are in the cold air path, since the net free area between the baffles are large and the velocity is low, the resistance it imposed on the air flow is minimal.

Figure 9A:
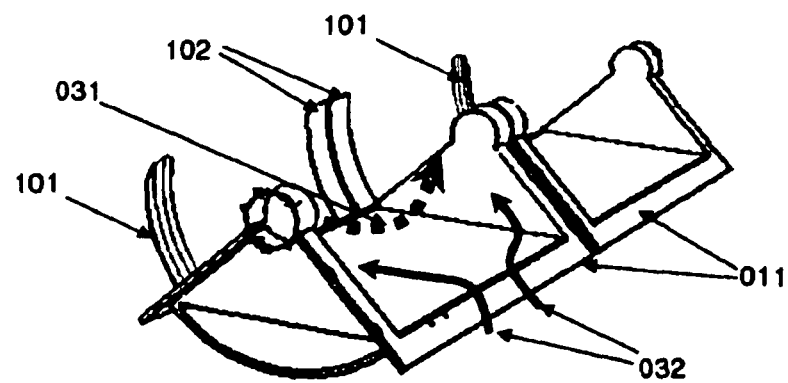
FIG. 9 is presents two isometric views of baffles in a cold air stream and a cross-sectional view of a vehicle ventilation housing.
Figure 9B:
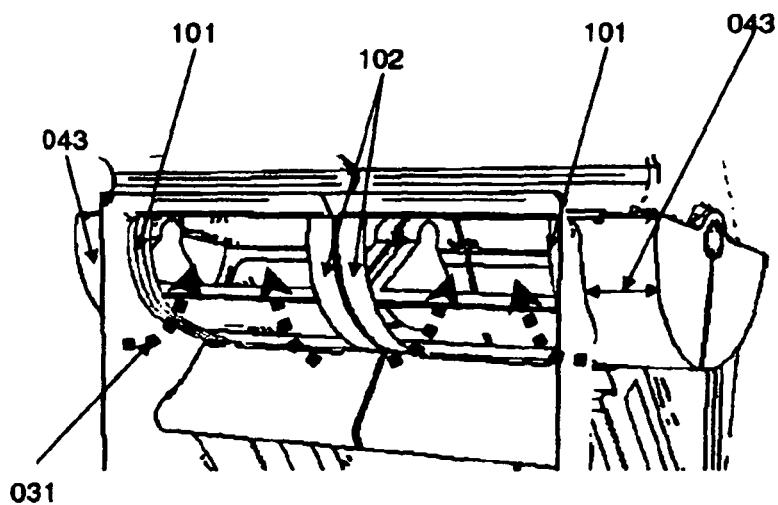
Figure 9C:
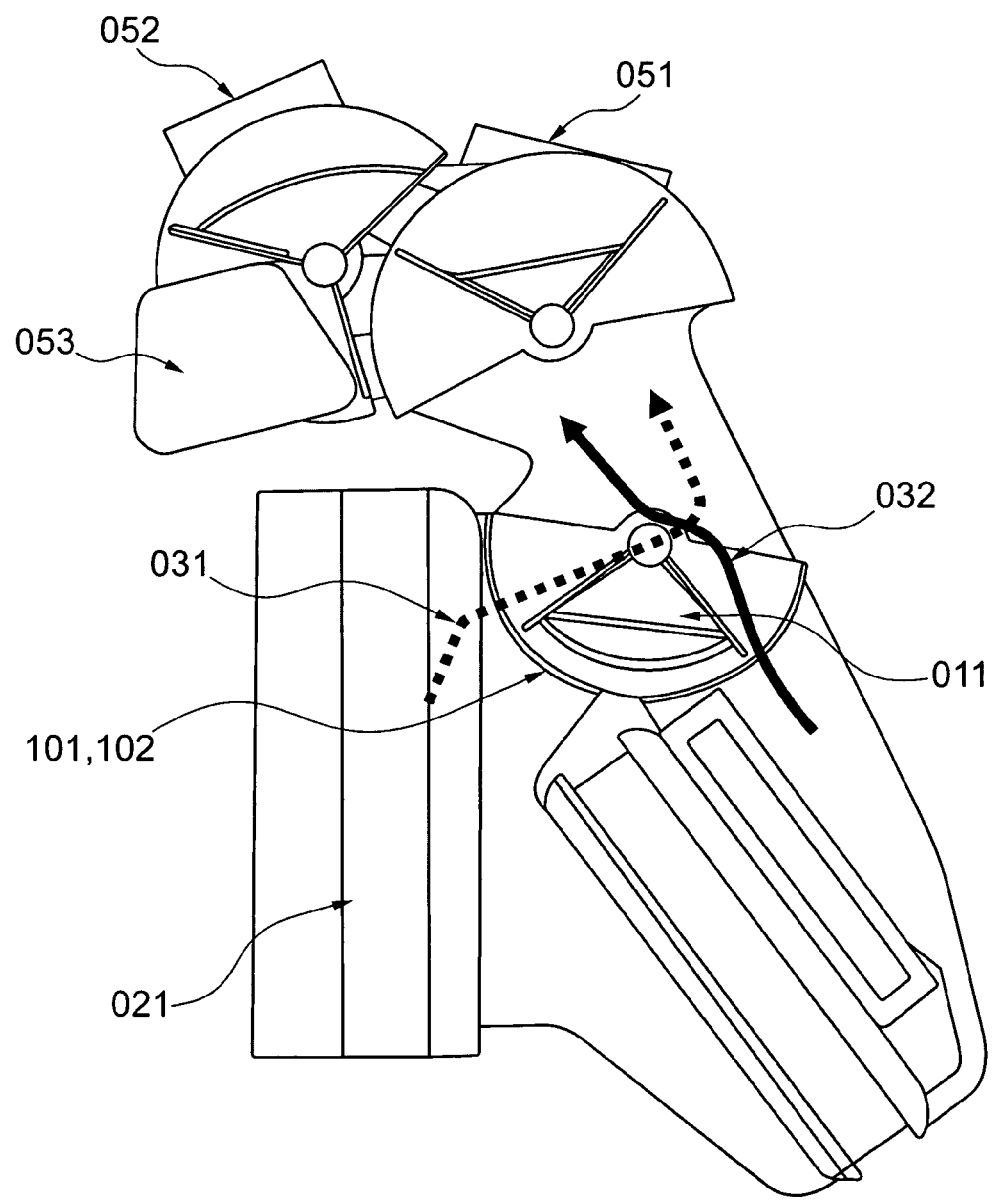

FIG. 9 shows an isometric view of the stratification baffles and their relative locations to the ventilation housing and temperature doors. FIG. 9a shows temperature door 11, having baffles 101 and 102 that interact with the cold and warm air streams 31 and 32. FIG. 9b shows an exterior view of baffles 101 and 102 in conjunction with temperature door 11 and a indentation 43 on the ventilation housing. FIG. 9c shows the flows of cold and hot air through the components shown in FIGS. 9a and 9b.

These baffles 101 and 102 help to reduce any horizontal temperature imbalance (such as a temperature imbalance between the panel center and outboard). The baffles can be utilized either independently or, in combination with the above listed embodiments. Baffle 101 is located on the side walls of the ventilation housing, upstream of the temperature door in the cold air path, between temperature door 11 and the air conditioner 21.

Baffle 101, together with indentation 43 deflect cold air stream toward the center part the ventilation housing and provide space for warm air to flow toward the front floor outlet 53. This increases the front floor temperature and provides a way to control temperature stratifications between the front floor and other air outlets. On the partition wall, baffle 102 deflects the cold air toward the outboard side of the ventilation housing and provides space for warm air to flow toward the panel center. This provides a way to control any temperature imbalance between the panel center and outboard, as well as between the defrost center and outboard. Therefore staggered cold air and warm air streams 31 and 32 are created. This not only provides a way to control temperature stratification, but also increases the mixing and reduces the temperature imbalance within each air outlet.

The invention has been described in reference to particular embodiments, but is not intended to be limited to these embodiments. As will be apparent to a person of skill in the art based on these teachings, numerous modifications could be made to the disclosed embodiments without departing from the invention. For example, the embodiments can be utilized in combination with other features, such as baffles on the housing, different shapes of mode doors that form a flow path in a specific mode to switch virtually the relative location of two outlets, or other, similar modifications.

What is claimed is:
1. An HVAC system, comprising:
a heater;
an air conditioner; and
a ventilation housing configured to conduct air from the heater or air from the air conditioner or both,
wherein the ventilation housing comprises:
a floor outlet;
a defrost outlet;
a panel outlet;
a first mode door configured to regulate a flow of air at the defrost outlet and at the floor outlet;
a second mode door;
a third mode door configured to select a mixture of air from the air conditioner and air from the heater;
a first baffle located on the ventilation housing and protruding from a side of the ventilation housing between the air conditioner and the third mode door, the first baffle being disposed upstream of the third mode door in a cold air path, and projecting above the heater, and
a second baffle that deflects cold air toward an outboard side of the ventilation housing and provides space for warm air to flow toward a panel center,
wherein the ventilation housing has an indentation on a side portion of the ventilation housing and disposed adjacent to the third mode door, which indentation is structured to deflect, along with the first baffle, cold air towards a center part of the ventilation housing and to provide space for warm air to flow toward the floor outlet.

2. The HVAC system of claim 1, wherein the defrost outlet is located proximate to the floor outlet.

3. The HVAC system of claim 1, wherein the first mode door comprises a first wall rotationally mounted on a first hinge member, a second wall rotationally mounted on the first hinge member, and an arc member connecting the first wall and the second wall, and wherein the first wall and the arc member are resistant to the flow of air.

4. The HVAC system of claim 3, wherein the second mode door is configured to regulate the flow of air at the panel outlet.

5. The HVAC system of claim 4, wherein the second mode door comprises a first wall rotationally mounted on a second hinge member, a second wall rotationally mounted on the second hinge member, and an arc member connecting the first and second walls of the second mode door, wherein the arc member of the second mode door is resistant to the flow of air, and wherein the first and second walls of the second mode door are resistant to the flow of air along parts of respective lengths of the first and second walls of the second mode door.

6. The HVAC system of claim 5, wherein the first mode door and the second mode door are each configured to pivot within a portion of the housing that is at least in part semicircular, such that a gap between a wall member and the semicircular portion of the housing is minimal for at least a portion of traversable angle of the respective first or second mode door.

7. The HVAC system of claim 4, wherein the ventilation housing is configured to be operable in a bi-level mode, and wherein the first mode door and the second mode door are configured to regulate the flow of air in the bi-level mode such that an air flow path is longer to the panel outlet than to the floor outlet.

8. An HVAC system capable of operating in a bi-level mode, comprising:

a heater;

an air conditioner; and a ventilation housing configured to conduct air from the heater or air from the air conditioner or both, wherein the ventilation housing comprises:

a floor outlet;

a defrost outlet;

a panel outlet;

a first mode door configured to regulate a flow of air at the defrost outlet and at the floor outlet;

a second mode door;

a third mode door;

a first baffle disposed upstream of the third mode door in a cold air path, the first baffle located on the ventilation housing and protruding from a side of the ventilation housing between the air conditioner and the third mode door, projecting above the heater, and structured to deflect a cold air stream toward a center part of the ventilation housing, and a second baffle that deflects cold air toward an outboard side of the ventilation housing and provides space for warm air to flow toward a panel center, wherein each of the first, second, and third mode doors comprises a first wall rotationally mounted on a hinge member, a second wall rotationally mounted on the hinge member, and an arc member connecting the first and second walls, and wherein the first baffle extends along a curve in a same direction as the arc member of the third mode door.

9. The HVAC system of claim 8, wherein the defrost outlet is located proximate to the floor outlet.

10. The HVAC system of claim 8, wherein the first wall of the first mode door and the arc member of the first mode door are resistant to the flow of air.

11. The HVAC system of claim 8, wherein the second mode door is configured to regulate the flow of air at the panel outlet.

12. The HVAC system of claim 11, wherein the arc member of the second mode door is resistant to the flow of air and the first and second walls of the second mode door are resistant to the flow of air along parts of respective lengths of the first and second walls of the second mode door.

13. The HVAC system of claim 12, wherein the first mode door and the second mode door are each configured to pivot within a portion of the housing that is at least in part semicircular, such that a gap between a wall member and the semicircular portion of the housing is minimal for at least a portion of traversable angle of the respective first or second mode door.

14. The HVAC system of claim 8, wherein the ventilation housing is configured to be operable in a bi-level mode, and wherein the first mode door and second mode door are configured to regulate the flow of air in the bi-level mode such that an air flow path is longer to the panel outlet than to the floor outlet.

15. The HVAC system of claim 12, wherein the third mode door is configured to select a mixture of air from the air conditioner and air from the heater.

16. A method of manufacturing an HVAC system, comprising:

providing a ventilation housing;

providing a first mode door configured to regulate a flow of air at a defrost outlet and at a floor outlet;

providing a second mode door configured to regulate the flow of air at a panel outlet; and providing a third mode door, wherein the ventilation housing is configured to be operable in a bi-level mode, wherein the first mode door and second mode door are configured to regulate the flow of air in the bi-level mode such that an air flow path is longer to the panel outlet than to the floor outlet, wherein a first baffle is located on the ventilation housing and protrudes from a side of the ventilation housing between an air conditioner and the third mode door, the first baffle being disposed upstream of the third mode door in a cold air path, and projecting above a heat source, wherein a second baffle deflects cold air toward an outboard side of the ventilation housing and provides space for warm air to flow toward a panel center, and wherein an indentation on a side portion of the ventilation housing and disposed adjacent to the third mode air door deflects, along with the first baffle, cold air towards a center part of the ventilation housing and provides space for warm air to flow toward the floor outlet.

17. The method of claim 16, wherein the first mode door comprises a first wall rotationally mounted on a first hinge member, a second wall rotationally mounted on the first hinge member, and an arc member connecting the first wall and the second wall, and wherein the first wall and the arc member are resistant to the flow of air.

18. The method of claim 17, wherein the second mode door comprises a first wall rotationally mounted on a second hinge member, a second wall rotationally mounted on the second hinge member, and an arc member connecting the first and second walls of the second mode door, and wherein the arc member of the second mode door is resistant to the flow of air and the first and second walls of the second mode door are resistant to the flow of air along parts of respective lengths of the first and second walls of the second mode door.

19. The method of claim 18, wherein the first mode door and the second mode door are each configured to pivot within a portion of the housing that is at least in part semicircular, such that a gap between a wall member and the semicircular portion of the housing is minimal for at least a portion of traversable angle of the respective first or second mode door.

20. A vehicle having a ventilation system comprising the HVAC system of claim 1.

21. The HVAC system of claim 1, wherein each of the first, second and third mode doors comprises a first wall rotationally mounted on a hinge member, a second wall rotationally mounted on the hinge member, and an arc member connecting the first and second walls.

22. The HVAC system according to claim 1, wherein the second baffle is located on and protrudes from the side of the ventilation housing.

23. The HVAC system according to claim 1, wherein the second baffle is discrete from the first baffle.

* * * * *